United States Patent [19]

Yoshioka

[11] Patent Number: 4,617,564
[45] Date of Patent: Oct. 14, 1986

[54] GRAPHIC DISPLAY SYSTEM WITH DISPLAY LINE SCAN BASED OTHER THAN POWER OF 2 REFRESH MEMORY BASED ON POWER OF 2

[75] Inventor: Yoshikazu Yoshioka, Kamakura, Japan

[73] Assignee: International Business Machines Corporation, Armonk, N.Y.

[21] Appl. No.: 542,327

[22] Filed: Oct. 17, 1983

[30] Foreign Application Priority Data

Feb. 24, 1983 [JP] Japan .................. 58-28635

[51] Int. Cl.$^4$ .............................................. G09G 1/02
[52] U.S. Cl. ................................... 340/798; 340/749; 340/750; 340/789
[58] Field of Search ............... 340/723, 724, 725, 726, 340/744, 748, 749, 750, 789, 798

[56] References Cited

U.S. PATENT DOCUMENTS

| | | | |
|---|---|---|---|
| 4,435,703 | 3/1984 | Hunt et al. ........................ | 340/744 |
| 4,468,662 | 8/1984 | Tanaka ............................. | 340/750 |
| 4,489,317 | 12/1984 | Shiga ............................... | 340/723 |
| 4,491,834 | 1/1985 | Oguchi ............................ | 340/723 |

*Primary Examiner*—Gerald L. Brigance
*Assistant Examiner*—Jeffery A. Brier

[57] ABSTRACT

A graphic display system using a cathode ray tube is disclosed, which display M line segments where M is based on an integer greater than 1 selected exclusively from integers not based on powers of 2 for each raster scanning line (line scan) in response to video data from a bit mapped refresh memory. The refresh memory is divided into memory blocks which are assigned sequential addresses and each store video dot data for one line segment. The memory is organized with N memory blocks for each scanning line, where N is an integer greater than M based on an integer selected from integers generated by powers of 2. The memory blocks are addressed with M blocks addressed during the display time and (N-M) blocks addressed during the remaining time of each line scan during which the CRT is blanked. The memory addressing rate is increased to complete the addressing of (N-M) blocks during the blanking time. This refresh memory addressing avoids complex memory block address calculation and also permits horizontal scrolling by the selection of a display start address.

2 Claims, 7 Drawing Figures

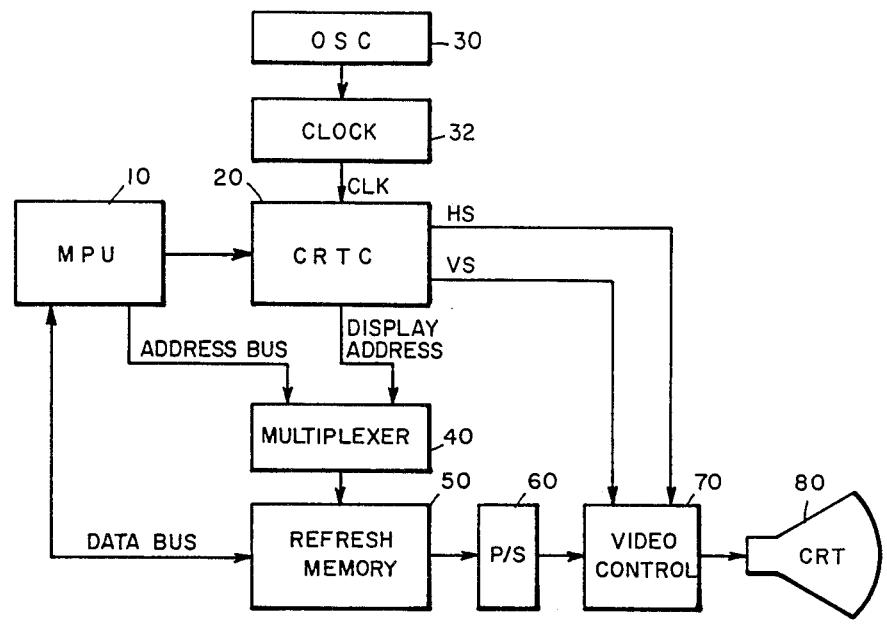
FIG. 1
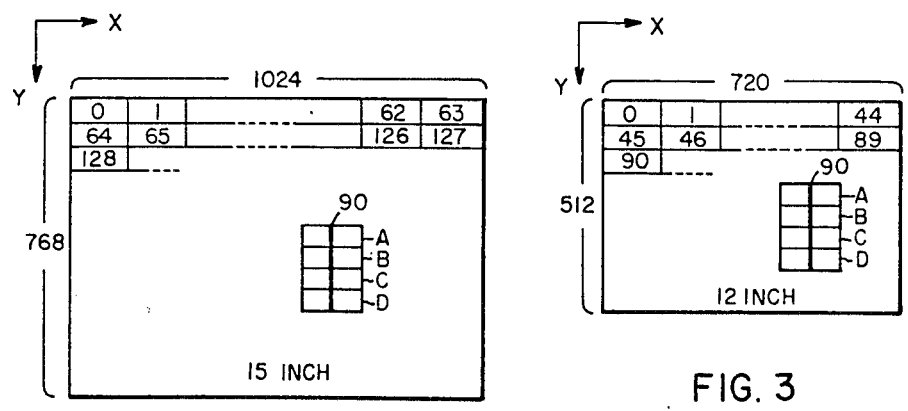
FIG. 2
FIG. 3

GRAPHIC DISPLAY SYSTEM WITH DISPLAY LINE SCAN BASED OTHER THAN POWER OF 2 REFRESH MEMORY BASED ON POWER OF 2

BACKGROUND OF THE INVENTION

This invention relates to raster scanning type display systems, and more particularly to cathode ray tube graphic display systems having a refresh memory for storing information to be displayed and facilities for scrolling such information. Some difficulties have been encountered in prior systems when addressing the refresh memory sequentially leading to complex address calculations when the display device has a number of line segments for each horizontal line scan based on an integer selected from integers not generated by power of 2.

SUMMARY OF THE INVENTION

In accordance with the present invention, a technique is provided in a graphic display system for facilitating the display of information on a raster scanning device such as a cathode ray tube (CRT) having a number of line segments in each scanning line (line scan) based on an integer selected exclusively from integers not generated by powers of 2 and the addressing of memory blocks of a related refresh memory and avoiding complex address calculations by organizing the refresh memory so that the number of memory blocks in the memory per scanning line is based on an integer selected from integers generated by powers of 2. Another feature of this invention is to facilitate scrolling of information in such a graphic display system.

For a better understanding of the present invention, together with other and further advantages and features thereof, reference is made to the description taken in connection with the accompanying drawings, the scope of the invention being pointed out in the appended claims.

BRIEF DESCRIPTION OF THE DRAWINGS

Referring to the drawings:

FIG. 1 illustrates a configuration of a graphic display system.

FIG. 2 illustrates a refresh memory for a 15 inch CRT.

FIG. 3 illustrates a refresh memory for a 12 inch CRT.

Abbreviations

Figure 4:
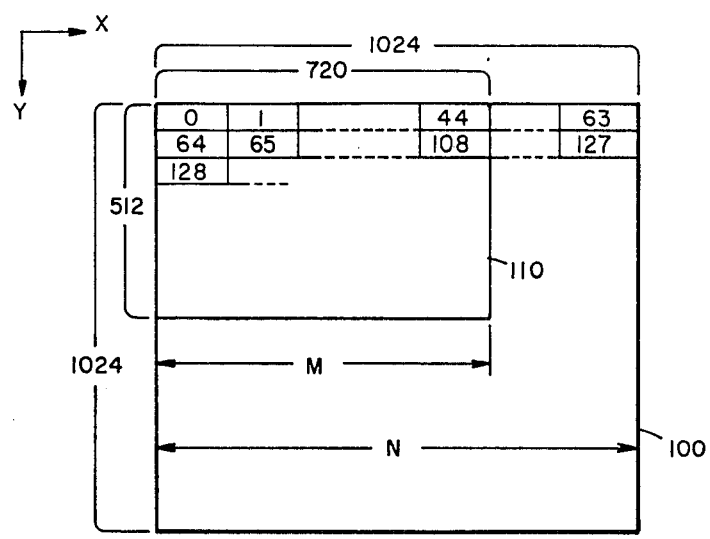
FIG. 4 illustrates the memory configuration of a refresh memory for use with a 12 inch CRT according to the present invention.

The following abbreviations are occasionally used herein:
CRT—Cathode Ray Tube
CRTC—Cathode Ray Tube Controller
DSAR—Display Start Address Register
HS—Horizontal Synchronizing
MPU—Microprocessor
OSC—Oscillator
P/S—Parallel/Serial
VH—Vertical Synchronizing

DETAILED DESCRIPTION

The graphic display system using a raster scanning type cathode ray tube (hereinafter referred to as a CRT) normally uses a bit mapped refresh buffer memory which assigns a data bit to each display dot or picture element. FIG. 1 shows a prior configuration of such a graphic display system. A refresh memory 50 stores video dot data which one to one correspond to dots of a graphic pattern such as characters and diagrams displayed on the CRT 80. The refresh memory 50 is addressed by a microprocessor (MPU) 10 or a CRT controller (CRTC) 20. The address from the CRTC 20 is selectively supplied to the refresh memory 50 through a multiplexor 40. The output of an oscillator (OSC) 30 is input to a clock circuit 32, and the clock circuit 32 outputs a clock signal CLK to the CRTC 20. The MPU 10 supplies addresses to the address bus for reading from and writing into the refresh memory 50 through a data bus. The CRTC 20 supplies display addresses to the refresh memory 50 during display operation to read the video dot data sequentially. The video dot data read by the CRTC 20 is serialized by a parallel/serial converter (P/S) 60, and then supplied to the CRT 80 through a video control circuit 70. The CRTC 20 provides a horizontal synchronizing signal (HS) and a vertical synchronizing signal (VS) to the video control circuit 70.

In such a graphic display, the number of dots displayed may vary depending on the size of the CRT. For example, a 15-inch CRT displays 1,024 dots in the X (horizontal) direction and 768 dots in the Y (vertical) direction, and a 12 inch CRT displays 720 dots in the X direction and 512 dots in the Y direction. Therefore, in case of the 15 inch CRT, the refresh memory stores 1,024×768 bits of video dot data, and in case of the 12 inch CRT, the refresh memory stores 720×512 bits of video dot data.

When a 16 bit microprocessor is used as the MPU 10, it is advantageous to divide the storage area of the refresh memory 50 into memory blocks of 1×16 bits and to address on a block by block basis. In the case of a 15 inch CRT, since each horizontal scanning line of 1,024 dots is divided into 64 line segments or display information units each containing 16 dots, 64 memory blocks must be read from the refresh memory in each horizontal scanning line. In the case of a 12 inch CRT, each horizontal line of 720 dots is divided into 45 line segments each containing 16 dots, and therefore, 45 memory blocks must be read from the refresh memory in each horizontal scanning line.

Such a graphic display, however, involves the problem that when sequential addresses are assigned to the memory blocks, the address calculation is very complicated unless the number of line segments per scanning line or the number of memory blocks to be read for each scanning line is represented by a power of 2. This problem will be described referring to FIGS. 2 and 3.

FIGS. 2 and 3 show refresh memories for a 15 inch CRT and a 12 inch CRT, respectively. The storage area of each refresh memory is divided into memory blocks each having 1×16 bits, and is addressed on a block by block basis. The memory blocks are assigned sequential addresses as shown by 0, 1, ..., and read sequentially in the order of the addresses by the CRTC during display operation.

In case memory blocks A, B, C and D, each in a different line scan are addressed from the microprocessor the specified bits of the memory blocks A, B, C and D are set to 1 as shown by reference number 90, and it is necessary to access the memory blocks A, B, C and D sequentially for writing the data. Since the addresses of memory blocks are sequential, the address of the memory block B is given by the address of the memory block A plus the number of memory blocks per scanning line, and so forth.

In the case of FIG. 2, the number of line segments or the number of memory blocks per scanning line is $64=2^6$, the sixth power of 2.

Therefore, the addresses of the memory blocks B, C and D can be obtained easily by adding a binary number 1000000 (equal to "64") to the addresses of the memory blocks A, B, and C, respectively. The address of any selected memory block can also be obtained easily. For example, if the memory block A is in the Xth position in Yth memory block row, the binary address of the storage block A can be obtained by $Y \cdot 2^6 + X$ easily.

In the case of FIG. 3, on the other hand, the number of memory blocks is 45 (101101 in binary), and integer that is not represented by any power of 2. To obtain the addresses of memory blocks B, C and D, the binary number 101101 must be added to the addresses of memory blocks A, B and C, respectively, making the address calculation complicated. Of course, complicated calculation is also required to obtain the binary address of any selected memory block. Since the method of address calculation for a 15 inch CRT differs from that for a 12 inch CRT, separate programs must be prepared depending on the size of CRTs.

Furthermore, when a refresh memory of a bit capacity corresponding to the number of display dots of a CRT screen is used as in FIGS. 2 and 3, scrolling cannot be accomplished unless the data of the refresh memory is rewritten. Since rewriting increases the burden of the program, it is desirable that scrolling is accomplished easily with hardware.

According to the present invention and in order to achieve efficient sequential addressing for a class of CRT display devices wherein a selected display device has a number of line segments per scanning line that is chosen as "M" where M is an integer larger than 1, selected exclusively from integers not generated by any power of 2, a refresh memory has N memory blocks per scanning line where N is an integer larger than M, selected from integers generated by a power of 2, M memory blocks are accessed during a display time interval and (N−M) memory blocks are accessed during a non-display time interval. The memory blocks are assigned sequential addresses. According to this invention, scrolling in X alone, or Y alone, or X and Y combined direction is accomplished by changing the display start address of the refresh memory.

FIG. 4 illustrates the memory configuration of a refresh memory according to this invention for use with a 12 inch CRT which displays 720×512 dots. The storage area of the refresh memory 100 is divided into memory blocks of 1×16 bits, and each memory block is assigned a sequential address. In this embodiment, the number of line segments or memory blocks actually used for display in each scanning line period, M, is 45 not being any power of 2, and the total number of memory blocks per scanning line, N, is 64 being the sixth power of 2. When the start address is 0, therefore, the area 110 is displayed on the CRT screen.

The CRT controller (CRTC) accesses M memory blocks during the display time in each horizontal scanning line period, and (N−M) memory blocks during the non-display time. This permits the use of the same addressing as described in connection with FIG. 2 even when the number of line segments in each scanning line is not any power of 2. The refresh memory in FIG. 4 is also usable for a 15 inch CRT without changing the program if 64 memory blocks (X direction)×768, dots (Y direction) are used. In FIG. 4, the 64 memory blocks shown in the X direction correspond to the 64 memory blocks per scanning line. The 1,024 dots in the Y direction however is arbitrarily chosen for convenience. Thus it is not necessarily based on a power of 2 and has only to be equal to or greater than the number of horizontal scanning lines, which is 512 for a 12 inch CRT and 768 for a 15 inch CRT.

Figure 5:
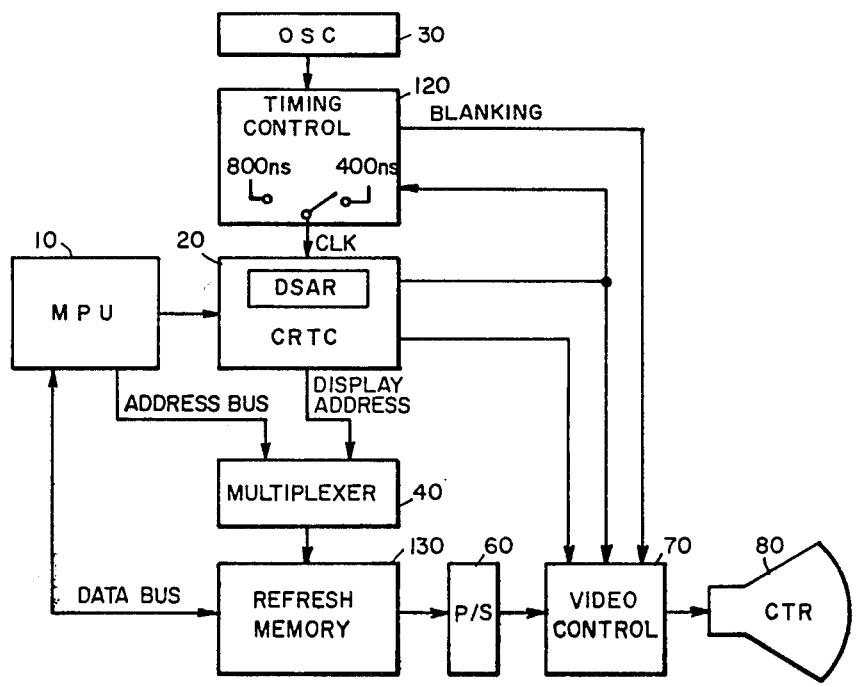
FIG. 5 illustrates the graphic display system of the present invention.

FIG. 5 illustrates a graphic display system of this invention, for utilizing a 12" CRT for example in conjunction with a refresh memory capable of storing a much larger amount of information than the CRT is able to display in one interval. However, the system of FIG. 5 enables more efficient addressing of the refresh memory and scrolling of the information. The 12" CRT is typically set up to have a number of line segments in each horizontal scanning line, such as 45, that is based on an integer not represented by a power of 2. But the usually encountered complex address calculations required for sequential addressing of memory blocks corresponding to the line segments is avoided by making use of a refresh memory organized with a number of memory blocks in each line of memory that is based on an integer such as 64, that is represented on the other hand, by a predetermined power of 2. The major difference between FIG. 1 and FIG. 5 is the use of a refresh memory 130 corresponding to memory 100 as shown in FIG. 4 and a timing control circuit 120 which switches the frequency of the basic clock CLK to the CRTC 20. Other elements, such as MPU 10, multiplexer 40, parallel/serial converter 60, and video control 70 perform functions, such as corresponding elements shown in FIG. 1.

The microprocessor (MPU) 10 is, for example, Intel iAPX-86, and the CRTC 20, is for example, Hitachi HD46505SP-2. The CRTC 20 can be initialized by the MPU 10 for various operational conditions for making display on the CRT 80, such as horizontal period, the number of horizontal scanning lines, the number of memory blocks to be accessed for each scanning line. In the embodiment of FIG. 4, the number of memory blocks accessed for each scanning line is set to 64. In this case, however, there arises a problem that timing error occurs between the horizontal period of the CRT 80 and the refresh memory access time for each scanning line. That is, under the operational condition suitable for displaying 720×512 dots on the 12 inch CRT 80, the horizontal period $T_H$ is, for example, 45.6 μs. On the other hand, since it takes 800 ns for accessing each memory block in a line segment and displaying it, the access time of 45 memory blocks to be actually displayed is 800 ns×45=36 μs, and the remaining time, 45.6−36=9.6 μs, is insufficient for accessing the remaining 19 memory blocks. In other words, letting $T_D$ and $T_B$ be the display time and the non-display time of each horizontal period, respectively, $[T_D/M] > [T_B/(N-M)]$, and if the refresh memory access rate of the CRTC 20 is fixed, 64 memory blocks cannot be accessed in each horizontal scanning line.

According to this invention, the frequency of the basic clock CLK to the CRTC 20 is switched between the display time $T_D$ and the non-display time $T_B$ by means of the timing control circuit 120. In this example, the clock CLK to the CRTC 20 runs at a period of 800 ns (frequency: 1.25 MHz) during the display time $T_D$ and at a period of 400 ns (frequency: 2.5 MHz) during the non-display time $T_B$. Since the CRTC 20 accesses a memory block in one cycle of the clock signal CLK, the memory blocks are accessed in the non-display time at a rate twice that in the display time. In the non-display time $T_B$, therefore, 19 memory blocks are accessed in 400 ns×19=7.62 μs. Consequently, the CRTC 20 accesses 64 memory blocks in 36 μs+7.6 μs=43.6 μs in each horizontal scanning. The CRTC 20 judges the number of the accessed memory blocks by the number of clock pulses CLK. The remaining time, 45.6 μs−43.6 μs=2 μs, is used for synchronization.

Figure 6:
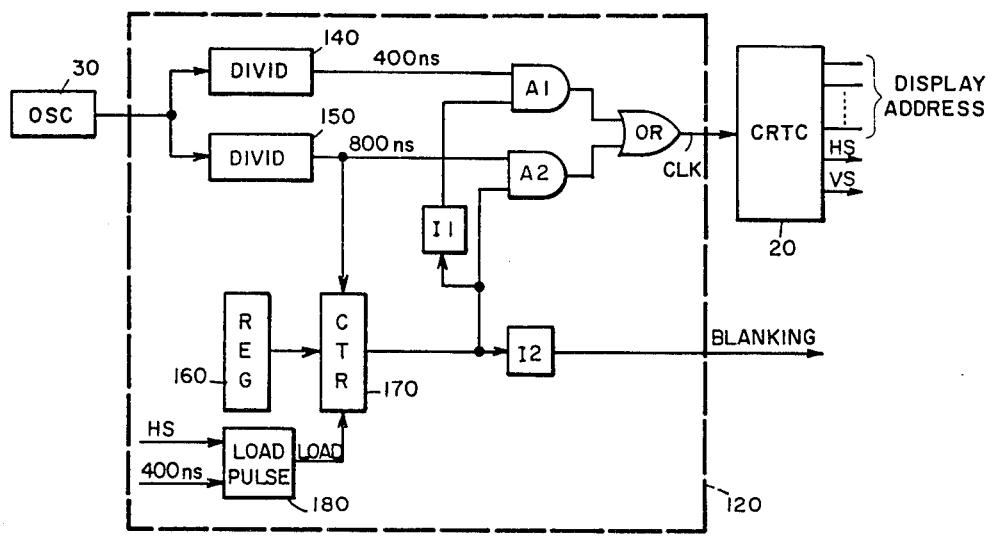
FIG. 6 illustrates a timing control circuit.
Figure 7:
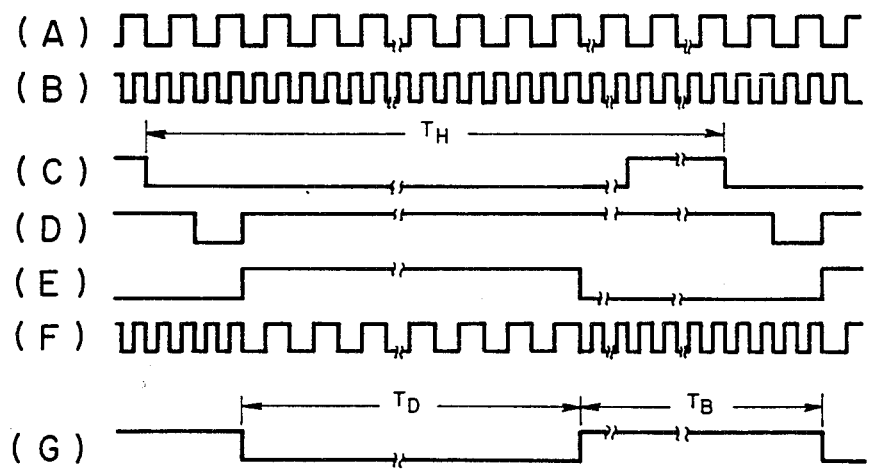
FIG. 7 illustrates the operational waveforms of the timing control circuit of FIG. 6.

FIG. 6 shows the timing control circuit 120, and FIG. 7 shows the operational waveforms thereof. An oscillator (OSC) 30 generates a 20 MHz signal which is converted to clock signals of 400 ns and 800 ns periods by frequency dividers 140 and 150 respectively. The 800 ns clock is shown as waveform A in FIG. 7, and the 400 ns clock, as waveform B. The number of 800 ns clock pulses required for accessing 45 memory blocks during the display time $T_D$, 45, is preset in a register 160, and this value is loaded into the counter 170 by a load pulse from a load pulse generator 180 prior to each display time $T_D$. The load pulse generator 180 receives the horizontal synchronizing signal HS (waveform C) from the CRTC 20 and the 400 ns clock, and as shown in waveform D, generates low level signals of 800 ns duration, 800 ns after the fall of the horizontal synchronizing signal HS, thereby providing the load pulses. $T_H$ in waveform C shows the length of a horizontal period.

The count value loaded in the counter 170 is counted down by the 800 ns clock. The counter 170 generates a high level when the count value is loaded, and generates a low level when the count value is counted down to 0 (waveform E). The counter output is applied to an AND circuit A1 through an inverter circuit I1, and also applied to an AND circuit A2. The AND circuits A1 and A2 receive the 400 ns and 800 ns clocks as another input, respectively. Therefore, the 800 ns clock is gated to the CRTC 20 through an OR circuit when the counter output is high, and the 400 ns clock is gated to the CRTC 20 when the counter output is low. Thus, the clock signal CLK as in waveform F is applied to the CRTC 20. Consequently, 45 memory blocks to be displayed in each scanning line are read by the 800 ns clock, and the remaining 19 memory blocks are read by the 400 ns clock. The output of the counter 170 is inverted by an inverter I2, and supplied to the video control circuit as a blanking signal (waveform G). Therefore, during the time $T_D$ (36 μs) when 45 memory blocks are read, display is permitted, and during the remaining time $T_B$ (9.6 μs), display is inhibited.

The CRTC 20 has a display start address register DSAR (FIG. 5) in which the address of a memory block to be first accessed in the first horizontal scan are set from the MPU 10. The CRTC 20 addresses sequentially the memory blocks starting with the address in the register DSAR. In this example, although 64 memory block locations are available horizontally the CRTC 20 addresses 45×512 memory blocks sequentially for display purposes, such as in block 110, FIG. 4. With the refresh memory of 64×1,024 memory blocks and only 45×512 memory blocks thereof displayed as shown in FIG. 4, redundant memory spaces are available in the refresh memory 130 in both X and Y directions, and therefore, scrolling can easily be accomplished in both X and Y directions by changing the start address of the register DSAR. Since 64 memory blocks in the X direction can be addressed by 6 bits and 1,024 lines in the Y direction, by 10 bits, any memory block can be addressed by 16 bits with 6 bits for X placed at the lower order part of the address and 10 bits for Y placed at the higher order part of the address. When the start address bits are all 0, the area 110 in FIG. 4 is displayed; when the higher 10 bits are all 0 and the lower bits are changed, the display is scrolled in the X direction; when the lower 6 bits are all 0 and the higher bits are changed the display is scrolled in the Y direction; and when both higher and lower bits are changed, the display is scrolled diagonally.

While a preferred embodiment of the invention has been illustrated and described, it is to be understood that there is no intention to limit the invention to the precise construction herein disclosed and the right is reserved to all changes and modifications within the scope of the invention as defined in the appended claims.

I claim:

1. A graphic display system for utilizing a raster line scanning display device having a number of line segments M in each line scan based on an integer selected exclusively from integers not generated by powers of 2 and normally requiring complex address calculations when sequentially accessing information from an associated refresh memory and further having a retrace time period at the end of each line scan, said system comprising:

a refresh memory having N memory blocks for each line scan of said display device wherein N is an integer greater than M, selected from integers generated by powers of 2, said memory blocks being assigned sequential addresses and each memory block storing video data for one of said line segments of said display device;

means for accessing M memory blocks from said refresh memory and supplying the information stored therein to said display device during a display time interval corresponding to each line scan period of said display device and accessing (N−M) memory blocks during the remaining time of each line scan period not including the retrace time period; and timing control means including clock means and counter means for accessing said memory blocks at a first clock frequency during the display time interval of each line scan and for detecting the completion of accessing of M memory blocks during the display time interval of each line scan period of said display device and said timing control means being further responsive to said detection of the completion of accessing to initiate access of memory blocks at a second clock frequency that is substantially higher than said first clock frequency and to inhibit displaying of said display device while said (N−M) memory blocks are accessed during the remaining time of each line scan period.

2. The graphic display system of claim 1, wherein:

$$[T_D/M] > [T_B/(N-M)]$$

where $T_D$ is the display time interval for each line scan period of said display device and $T_B$ is the remaining time interval for each line scan period, said $T_B$ time interval being predetermined as a relatively short time interval in relation to the time interval $T_D$, and wherein said timing control means incorporates frequency control means to increase the clock frequency to said accessing means in response to said counter means count output to insure that accessing of $(N-M)$ memory blocks during each lines scan period is completed during the time interval $T_B$.

* * * * *